(12) United States Patent
Graumann et al.

(10) Patent No.: US 9,280,207 B2
(45) Date of Patent: Mar. 8, 2016

(54) METHODS AND SYSTEMS FOR TYPING

(75) Inventors: David L. Graumann, Portland, OR (US); Jennifer Healey, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,502

(22) PCT Filed: Dec. 29, 2011

(86) PCT No.: PCT/US2011/067767
§ 371 (c)(1),
(2), (4) Date: Mar. 19, 2014

(87) PCT Pub. No.: WO2013/101029
PCT Pub. Date: Jul. 4, 2013

(65) Prior Publication Data
US 2014/0292661 A1   Oct. 2, 2014

(51) Int. Cl.
*G06F 3/02* (2006.01)
*G09G 5/00* (2006.01)
*B62D 1/04* (2006.01)
*G06F 3/023* (2006.01)

(52) U.S. Cl.
CPC *G06F 3/02* (2013.01); *B62D 1/046* (2013.01); *G06F 3/0219* (2013.01); *G06F 3/0235* (2013.01)

(58) Field of Classification Search
CPC ...... G06F 3/02–3/027; G06F 3/0489–3/04897

USPC ............. 345/168–172; 341/22–34; 340/407.2
See application file for complete search history.

(56) References Cited

U.S. PATENT DOCUMENTS

| 8,294,679 | B2* | 10/2012 | Wada | 345/173 |
| 2004/0030807 | A1* | 2/2004 | Wessler et al. | 710/1 |
| 2010/0268426 | A1* | 10/2010 | Pathak et al. | 701/48 |
| 2011/0052296 | A1* | 3/2011 | Abe | 400/484 |

FOREIGN PATENT DOCUMENTS

| KR | 10-2002-0040963 A | 5/2002 |
| KR | 10-2003-0050151 A | 6/2003 |
| KR | 10-2005-0060158 A | 6/2005 |
| KR | 10-2008-0045023 A | 5/2008 |
| WO | 2013/101029 A1 | 7/2013 |

OTHER PUBLICATIONS

International Preliminary Report on Patentability and Written Opinion received for PCT Patent Application No. PCT/US2011/067767, mailed on Jul. 10, 2014, 7 Pages.
International Search Report and Written Opinion received for PCT Application No. PCT/US2011/067767, mailed on Sep. 28, 2012, 10 pages.

* cited by examiner

*Primary Examiner* — Stephen Sherman
(74) *Attorney, Agent, or Firm* — Sutherland Asbill & Brennan LLP

(57) ABSTRACT

Methods, systems, and apparatus for selecting symbols based on actuation of one or more keys or switches associated with a vehicle. One or more processors may interpret signals generated from the one or more keys or switches to ascertain symbols associated with the same.

30 Claims, 6 Drawing Sheets

METHODS AND SYSTEMS FOR TYPING

TECHNICAL FIELD

This invention generally relates to typing, and more particularly to methods and systems for typing.

BACKGROUND

Communications technologies provide tools that enhance human connectivity. In particular, communications tools, such as texting, short message services (SMS), email, Tweets®, blogging, micro-blogging, and the like, provide users with rapid connectivity and the ability to share information quickly and efficiently. When performed from mobile devices, such as cell phones, smart phones, tablet computers, netbook computers, and the like, rapid connectivity solutions are enabled anywhere.

People may use mobile communications devices within transportation vehicles. Furthermore, such usage may be by the person operating the vehicle. Such activity may result in the operator being distracted. In the context of a road vehicle, such as a car, a driver of the vehicle, if using a mobile communications device, may be driving in a distracted manner. In other words, the driver may not be paying full attention to the road and the surroundings while driving, since part of the driver's attention may be diverted to operating the mobile communications device.

In certain cases, the driver may be operating a keyboard based mobile communications device, such as a smart phone, for the purposes of texting or emailing. In this case, the driver may have to look at the keyboard, either electronic or physical, of the smart phone to find the appropriate keys to press. During this process, the driver may not be looking at the road or paying full attention to the parameters that need consideration during driving. Furthermore, the driver, while operating the keyboard-based mobile communications device, may be using one or both hands to enter text onto the mobile communications device. In other words, the driver may be touching various physical or virtual alphanumeric keys on the mobile communications device to generate written messages. Therefore, one or more of the driver's hands may not be on control interfaces, such as the steering wheel, of the vehicle.

Therefore, the use of mobile communications devices while driving, especially for text entry purposes may have the dual effect of the driver not putting both hands on the steering wheel and not looking at the road. As a result, operating mobile communications devices may make a driver more error prone and, thereby, compromise the safety of the driver and other occupants of the vehicle.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the invention are described more fully hereinafter with reference to the accompanying drawings in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure provide systems, methods, and apparatus for a user to provide symbolic input, such as alphanumeric input, to a variety of communications devices with the use of a keyboard disposed on a steering wheel of a vehicle. The keyboard may have fewer keys than the full set of symbols that can be represented by the keyboard. Therefore, keys may be multiplexed and appropriate symbols may be selected using the keyboard by pressing one or more keys, buttons, or switches simultaneously. In certain embodiments, the keyboard may be disposed on the steering wheel in more than one section. Each of the sections may be accessible by one or more fingers on one or both hands of the driver of the vehicle. The sections may further be accessible to the driver without the driver having to remove his or her hands from a rim of the steering wheel. The keyboard may further have a toggle switch that selects a set of symbols to ascribe to a set of keys. Based on the position of the toggle switch, a first set of symbols may be ascribed to the keys, and at another position of the toggle switch, a second set of symbols may be ascribed to the keys. The toggle switch and the keys may be in different sections of the keyboard. The keyboard may yet further include a scroll input element. The scroll input element may further be disposed in a separate section than the toggle switch or the keys. In certain other embodiments, keys may be disposed on the steering wheel that may be depressed in any combination or permutation. Each combination of pressed keys may correspond to a symbol, such as an alphanumeric symbol. In one aspect, the number of combinations in which the keys can be pressed at least equals the total number of symbols. In certain embodiments, a display device may additionally be provided on the steering wheel to display symbols selected with the keyboard.

Example embodiments of the invention will now be described with reference to the accompanying figures.

Figure 1:
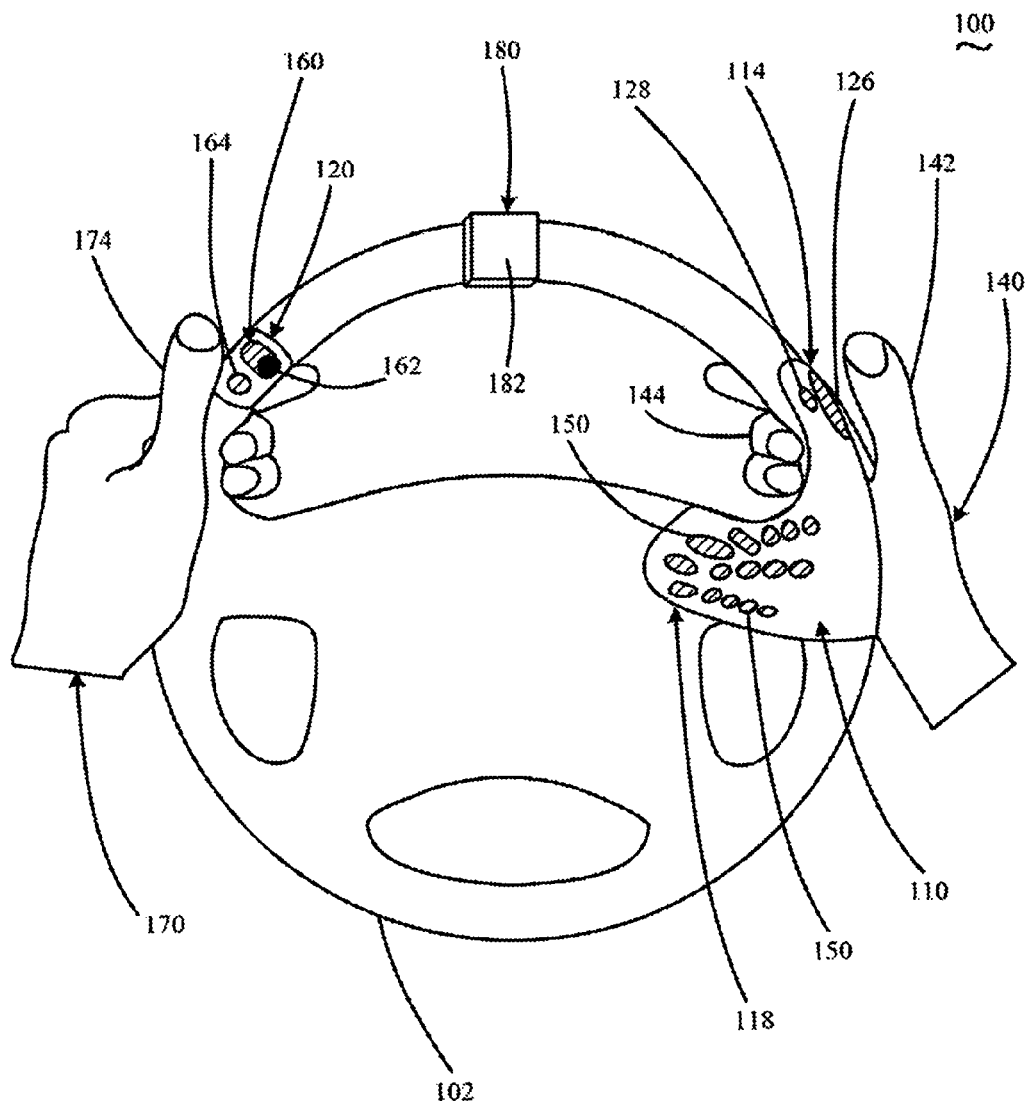
FIG. 1 is a simplified schematic diagram illustrating an example steering wheel with an example keyboard and display device disposed thereon in accordance with embodiments of the disclosure.

Referring now to FIG. 1, an example steering wheel system 100 with an example steering wheel 102 with a keyboard 110 disposed thereon is illustrated. The keyboard 110 may be provided in one or more sections, such as a first section 114, a second section 118, and a third section 120. The first section 114 may include a scroll slider 126 and one or more buttons 128. The second section 118 may include a plurality of keys 150. For example, as depicted, there may be 15 keys 150. The third section 120 may include a sliding switch 160 and one or more buttons 164.

The first keyboard section 114 may be disposed on the steering wheel 102 in a location such that the scroll slider 126 may be convenient to actuate using the thumb 142 on one's hand 140. In one aspect, one may be able to hold the steering wheel 102 with one's other fingers 144 while actuating the scroll slider 126 with the thumb 142. Therefore, one may be able to control electronic devices and controls without taking their fingers 144 off of the steering wheel 102. The one or more buttons 128 of the first section 114 may also be disposed on one or both sides of the scroll slider 126 in a location where the thumb 142 may be used to actuate the same.

The scroll slider 126 may be a capacitive sensing element (not shown) that can detect the presence of the charge sink, such as the thumb 142, when in proximity or touching the scroll slider 126. The scroll slider 126, and the capacitive sensing element associated therewith may include a plurality of capacitive cells (not shown) that can be used to locate where on the scroll slider 126 the thumb 142 is detected. In other words, the scroll slider 126 is configured to detect where on its surface a user is touching the scroll slider 126. Based on the location of the touch, the scroll slider 126 and the associated first keyboard section 114 may generate a keyboard signal indicating the location of the touch. For example, if the scroll slider 126 is touched with the thumb 142 near one end, such as the top, then the keyboard signal may indicate the same. Similarly, if the scroll slider 126 is touched near the bottom of the scroll slider 126, then the keyboard signal may indicate the same.

In certain embodiments, the one or more buttons 128 may, include a button disposed on either side of the scroll slider 126. As depicted here, the button 128 provided on the rear side of the steering wheel 102 can not be seen, but may be of similar size and shape as the button 128 that can be seen on the front of the steering wheel 102. Like the scroll slider 126, the one or more buttons 128 may be capacitive sensing elements (not shown) that can detect the presence of an object, such as the thumb 142, when in proximity or touching the one of the one or more buttons 128. The one or more buttons 128 may be formed in an oval shape to enable one to touch the same using the thumb 142 without removing the other fingers 144 from the steering wheel 102. In certain embodiments, the one or more buttons 128 may have ridges on the outside perimeter of the button 128. The ridge may provide tactile feedback to a person that is touching the one or more buttons 128. For example, a person touching the one or more buttons 128 may be able to tell that they have touched the button 128 using their sense of touch without having to look directly at the button 128 and, therefore, may be able to continue looking at the road while driving rather than looking at the keyboard 110. In other embodiments, there may be a localized haptic or vibrational feedback when the one or more buttons 128 have been touched by a user.

It should be noted that while the first keyboard section 114 is depicted on the rim of the steering wheel 102, it may be provided on any suitable location, such as the hub of the steering wheel 102. Additionally, while a single scroll slider 126 is depicted, there may be any number of scroll slider elements or other input interfaces associated with the first keyboard section 114. Furthermore, while two buttons 128 are discussed, there may be any number of buttons 128 for excepting input from the user associated with the first keyboard section 114. In certain embodiments, the first keyboard section 114 may be provided at a different location than depicted in FIG. 1. For example, a left-handed user may prefer to have the first keyboard section 114 on the left-hand side of the steering wheel 102.

The second keyboard section 118 may be in relatively close proximity to the first keyboard section 114 so that the keys 150 provided on the second section 118 may be actuated using the same thumb 142 that is used to actuate the scroll slider 126 and the one or more buttons 128. In certain embodiments, the keys 150 may be of different shapes and sizes. In one aspect, the shapes and sizes of the keys 150 may enable the thumb 142 to actuate the same without removing the other fingers 144 of the same hand 140 from the steering wheel 102. The keys 150 that are relatively more distal from the rim of the steering wheel 102 may be relatively larger in area and more elongated in shape than the keys 150 that are relatively more proximal to the rim of the steering wheel 102. Additionally, the keys 150 that are relatively more distal from the other fingers 144 may be relatively smaller in area and more circular or less elongated than the keys 150 that are relatively more proximal to the other fingers 144 during operation of the keyboard 110.

The keys 150 may further have a ridge on their perimeter to provide tactile feedback to the user that may be actuating the keys 150. Alternatively, the keys 150 may have a protrusion disposed thereon to similarly provide tactile feedback to the user that may be actuating the keys 150. In certain embodiments, haptic or vibrational feedback may be provided to a user that actuates one or more of the keys 150. In these embodiments, there may be a vibration generator associated with the one or more keys 150.

As with the case of the one or more buttons 128 of the first keyboard section 114, the keys 150 may be capacitive sensors that can detect an object, such as the thumb 142, in proximity of or touching one or more of the keys 150. When one or more of the keys 150 are actuated, the keyboard 110 may generate a keyboard signal indicating the same. In one aspect, the keyboard signal may indicate which of the keys 150 has been actuated or touched. In the context of the keyboard 110, each of the keys may represent one or more respective symbols. In one aspect, a single symbol may be selected by a user by actuating one of the keys 150 in addition to one or more other elements of the keyboard 110. Therefore, when one or more elements of the keyboard 110 including the keys 150 are actuated, the keyboard signal may be indicative of a symbol associated with the combination of elements that are actuated.

While the second keyboard section 118 is depicted to be attached to the first keyboard section 114, any suitable configuration of the first 114 and second 118 keyboard sections may be provided. As a result, in certain embodiments, the first keyboard section 114 may be relatively more distal from the second keyboard section 118 than what is depicted in FIG. 1. As in the case with the first keyboard section 114, the second keyboard section 118 may be provided on any suitable location of the steering wheel 102. For example, while depicted on the right-hand side of the steering wheel 102, the second keyboard section 118 may alternatively be provided on the left-hand side of the steering wheel 102 in accordance with certain embodiments of the disclosure.

It should also be noted that the depiction of the keys 150, as shown in FIG. 1, is only one possible implementation. In other embodiments, the keys 150 may be provided in alternative configurations. For example, in certain embodiments, the relative placement of the keys 150 may be different from that depicted in FIG. 1. Alternatively, the relative site and shape of the keys 150 may be different than what is depicted.

Further yet, in other embodiments, there may be a different number of keys 150 than the number shown as an illustrative example in FIG. 1.

The third keyboard section 120 may be positioned on the steering wheel 102 in a manner where the sliding switch 160 and the button 164 may be actuated using a thumb 174 of a hand 170. In certain embodiments, the thumb 174 may be used to touch the sliding switch 160 or the bottom 164 without removing the rest of the hand 170 from the rim of the steering wheel 102. In one aspect, the hand 170 that may be used to actuate the elements of the third keyboard section 120 may be a different hand than the hand 140 used to actuate the elements on the first keyboard section 114 and the second keyboard section 118. In other embodiments, the same and may be used to operate the third keyboard section 120 and the first keyboard section 114.

While the third keyboard section 120 is depicted as being relatively more distal from the first keyboard section 114 than the second keyboard section 118, in other embodiments, the third keyboard section 120 may be relatively more proximal to the first keyboard section 114 than the second keyboard section 118 is to be first keyboard section 114. As a further alternative, the third keyboard section 120 may be relatively more proximal to the second keyboard section 118 than the first keyboard section 114 is to the second keyboard section 118. While the third keyboard section 128 is depicted on the rim of the steering wheel 102, the third keyboard section 120 may be provided at any suitable location, including the hub of the steering wheel 102.

The sliding switch 160 may have a slide element 162 that may be placed in more than one position, where each position corresponds to a respective state. For example, the slide element 162 may be pushed using the thumb 174 to a left-hand side position of the sliding switch 160 or the right-hand side position of the sliding switch 160. In this example, the sliding switch 160 may have two different states and keyboard signals generated by the keyboard 110 may be indicative of the state of the sliding switch 160. As a further sample, the slide element 162 may be placed in three different positions, such as to the left, in the middle, and to the right, thereby providing three distinct states of the sliding switch 160. As with the previous example, the keyboard signals generated by the keyboard 110 may indicate the state of the sliding switch 160. In certain embodiments, the slide switch may include a capacitive touch sensor. In certain aspects, the capacitive touch sensor may have three touch positions that may be actuated by a user's finger. In certain embodiments, the sliding switch 160 in combination with the keys 150 of the second keyboard section 118 may be controlled by the user to generate a desired symbol, such as an alphanumeric character. In other words, a key 150 may be actuated while the sliding switch 160 is in a particular state to generate one symbol. The same key 150, in another instance, may be actuated while the sliding switch 160 is in a different state and, as a result, generate a different symbol than the symbol generated with the sliding switch 160 in the aforementioned particular state. Therefore, multiple symbols may be associated with each of the keys 150 and a particular symbol may be ascribed to each of the keys 150 based upon the state of the sliding switch 160. In one aspect, there may be relatively fewer keys 150 than the total number of symbols that can be generated or selected by a user using the keyboard 110. In another aspect, the selection of a symbol may be performed by actuating more than one element of the keyboard 110. In yet another aspect, the overall size of the keyboard 110 may be relatively smaller than a keyboard where each key is mapped to particular symbol. It should also be noted, that the mapping of symbols may be unrelated symbols. For example, a particular key 150 may be associated with both the letter "Q" and the letter "Y." In this case, the symbols associated with the particular key 150 are unrelated to each other. For example, the symbols are not a lower case and an upper case version of the same letter.

The button 164 may be similar to the one or more buttons 128 associated with the first keyboard section 114. In one aspect, the button 164 may be a capacitive sensor that can sense an object, such as the thumb 174, in proximity to or touching the button 164. In one aspect, the thumb 174 may provide a path for charge associated with the capacitive sensor and thereby perturb the charge thereon. The change in charge of the capacitance sensor may be detected as the thumb 174 contacting the button 164. The keyboard signals generated by the keyboard 110 may indicate whether the button 164 has been touched. As with the case with the one or more buttons 128, the button 164 may have tactile elements associated therewith. Such tactile elements may enable the driver of the vehicle to pay attention to the road and other aspects of driving without having to look at the keyboard 110. For example, the button 164 may have a ridge that protrudes along the perimeter of the button 164. Alternatively, the button 164 may have a single protrusion extending therefrom. The button 164 may correspond to one or more symbols. In certain embodiments, the button 164 may correspond to a space key. In other embodiments, the button 164 may be used to select between multiple symbols associated with the keys 150.

The steering wheel 102 may further have a display device 180 with a display screen 182 provided thereon. In one aspect, as a driver uses the keyboard 110 to select a series of symbols, such as letters, words, sentences, and acronyms, the series of symbols may be displayed on the display screen 182 of the display device 180. In another aspect, the display device 180 may be positioned at a location on the rim of the steering wheel 192 where the driver may be able to view the display screen 182 either using peripheral vision or with minimal eye movement. For example, the display device 180 may be provided at the top, or the 12 o'clock position, of the steering wheel 102. In certain embodiments, the display device 180 may be configured to be moved along the rim of the steering wheel 102. In other embodiments, the display device 180 may include a motorized element that allows the display device 180 to move automatically as the driver turns the steering wheel 102 to one side or the other. In one aspect, the display device 180 may receive signals to control its movement. In another aspect, the display device 180 may move along the rim of the steering wheel 102 in a manner such that the display device 180 is substantially near the top, or the 12 o'clock position, of the steering wheel 102.

The display device 180 may be any suitable type of display including, but not limited to, a touch screen, a liquid crystal display (LCD), a thin-film transistor (TFT) display, an organic light emitting diode (OLED) display, a plasma display, a cathode ray tube (CRT) display, or combinations thereof. In one aspect, the display device 180 may receive display signals and, based upon the display signals, provide still or moving images corresponding to the display signals. In another aspect, the images displayed on the display device may be viewed by one or more users, such as the driver using the steering wheel 102.

It should be noted that the steering wheel 102 may have a variety of other controls provided thereon. Therefore, in certain embodiments, the steering wheel 102 may be crowded with controls, buttons, selectors, interfaces, and the like, and therefore may have limited space for the keyboard 110. Ascribing multiple symbols to the keys 150 with a multiplexing scheme may therefore reduce the amount of real estate consumed by the keyboard 110 on the steering wheel 102.

The steering wheel 102 may be provided in a vehicle for the purpose of controlling the operation of the vehicle, such as steering the vehicle. For the purpose of this discussion, the vehicle may include, but is not limited to, cars, trucks, light-duty trucks, heavy-duty trucks, pickup trucks, minivans, crossover vehicles, vans, commercial vehicles, private vehicles, sports utility vehicles, tractor-trailers, aircrafts, airplanes, jets, helicopters, space vehicles, watercrafts, or any other suitable vehicle with communicative and sensory capability. However, it will be appreciated that embodiments of the disclosure may also be utilized in other transportation or non-transportation related application with symbol entry, such as text entry.

Figure 2:
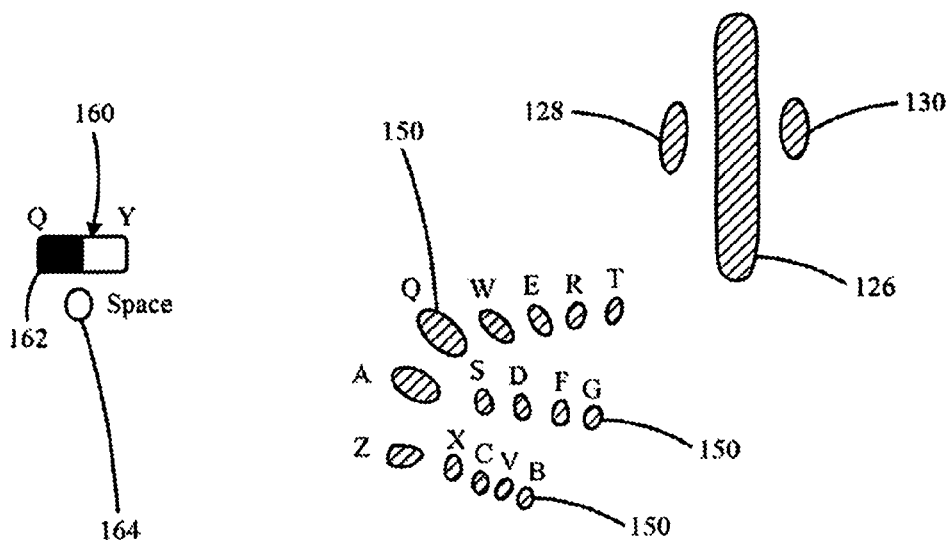
FIG. 2 is a simplified diagram illustrating an example alphanumeric key allocation for the example keyboard of FIG. 1 in accordance with embodiments of the disclosure.
Figure 3:
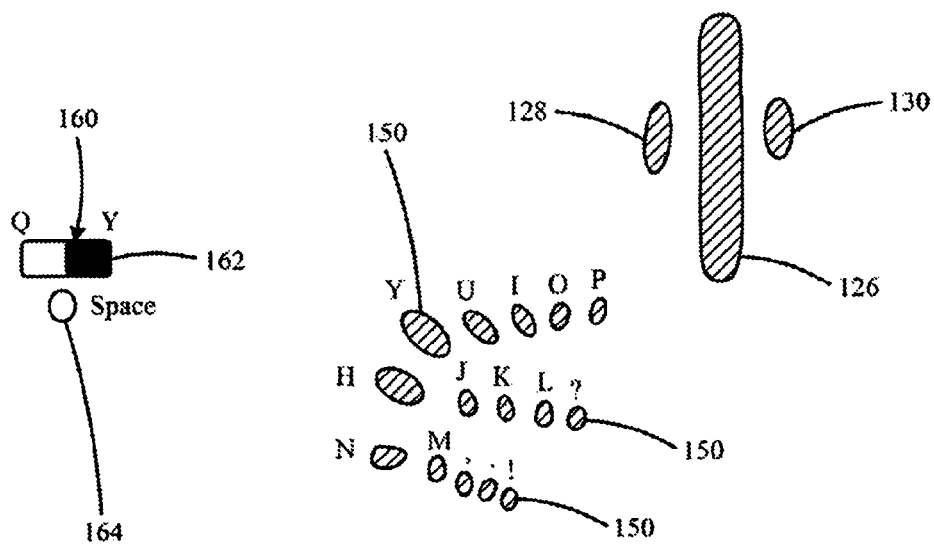
FIG. 3 is a simplified diagram illustrating another example alphanumeric key allocation for the example keyboard of FIG. 1 in accordance with embodiments of the disclosure.

Referring now to FIGS. 2 and 3, the elements of the example keyboard 110 are shown schematically to illustrate the operations thereof with discussion of an example allocation of keys 150 in accordance with embodiments of the disclosure. In this view, the scroll slider 126 is depicted as an elongated element where the thumb 142 can be used to touch various portions along the length of the scroll slider 126. In addition, the thumb 142 can be slid along the length of the scroll slider 126. Touching portions of the scroll slider 126 where sliding one's finger along the length of the scroll slider 126 may result in a keyboard 110 providing keyboard signals indicating the same. This keyboard signal indicative of actuating the scroll slider may be interpreted by processing elements as a scroll function. For example, such a scroll function may be used by a user, such as the driver, to scroll through one or more messages in a list of messages. As another example, the scroll function may be used by a user to scroll through pages of text. As yet another example, the scroll function may be used by a user to select one or more controls presented as icons or indicia on a display. As discussed above, the first keyboard section 114 may include the button 128 on the front side of the steering wheel 102 and a button 130 on the back side of the steering wheel. These buttons 128 and 130 may be used in conjunction with the scroll slider 126 to select an element within a list or collection of elements. For example, the scroll slider 126 may be used to scroll through a list of music. The button 128 may be selected to get more information on a particular song and button 130 may be selected to play a particular song. Similarly, the scroll slider 126 may be used to scroll through a list of text messages on an electronic device, such as a smart phone, and buttons 128 and 130 may be selected to display the text of the text message and to respond to the text message, respectively.

Now referring to the sliding switch 160, the slide element 162 may be placed in one of two positions, such as the left side as illustrated in FIG. 2 or the right side as illustrated in FIG. 3, of the sliding switch 160. The depicted example embodiment, the position of the slide element 162 on the third keyboard section 120 may correspond with a particular allocation of symbols associated with each of the keys 150 on the second keyboard section 118. Therefore, the slide element positioned to the left may correspond with a "Q" setting, where "Q" may be the symbol or character corresponding to the top left key 150 of the second keyboard section 118. Similarly, the slide element positioned to the right may correspond with a "Y" setting, where "Y" may be the symbol or character corresponding to the top left key 150 of the second keyboard section 118. As can be observed, when the slide element 162 is set to Q position, the allocation of symbols, or characters, to each of the keys 150 may be as depicted in FIG. 2. The symbols in the state generally correspond to the left-hand side of a standard QWERTY keyboard. Similarly, when the slide element 162 is set to Y position, the allocation of symbols, or characters, to each of the keys 150 may be as depicted in FIG. 3. The symbols in the state generally correspond to the right-hand side of a standard QWERTY keyboard.

As described above, the user may select one or more symbols, such as letters, by appropriately positioning the slide element 162 within the sliding switch 160 and selecting one or more keys 150. In one aspect, the elements being actuated may be from different sections of the keyboard 110. As depicted, elements from both the second keyboard section 118, as well as, the third keyboard section 120 may be actuated. In certain embodiments, the elements on the second keyboard section 118 may be actuated with a different hand than the hand used by the user to actuate the elements on the third keyboards section 120. For example, the second keyboard section 118 and the keys 150 thereon, may be actuated using the thumb 142 of the right hand 140, and the sliding switch 160 may be actuated using the thumb 174 of the left hand 170. Therefore, the user, such as the driver, may be able to select symbols, such as letters, without removing either hands 140 and 170 from the steering wheel 102. In other words, the driver may be able to type on an interface with electronic devices that use typing as a mechanism for information entry from a user without removing either hands 140 and 170 from the steering wheel. Furthermore, the user may be able to continue looking at the road while typing on the keyboard 110.

The button 164 may be used for any suitable symbolic entry. Additionally, the actuation of the button 164 may be used to select between one or more symbols ascribed to each of the keys 150. In other words, in certain embodiments, the button 164 may function in a similar capacity as the sliding switch 160. In certain embodiments, the button 164 may correspond with a space between symbols.

The actuation of the various elements of the keyboard 110 may result in generation of keyboard signals representative of the individual or combination of elements that are actuated. The signal generated by the keyboard 110 may be any suitable analog or digital signal. In certain embodiments, the signals generated by the keyboard 110 may be an American Standard Code for Information Interchange (ASCII) protocol based signal.

While the keys 150 are depicted as representing Latin letters, it will be appreciated that the keys may represent any style or family of scripts including, but not limited to, phonetic, alphabetic, logographic, syllabic, or combinations thereof. It should also be noted that the keys may represent any suitable language and scripts thereof, including, but not limited to, Latin, Cyrillic, Devanagari, Arabic, or combinations thereof. Within a particular writing system, characters may be modified for certain languages based on input from one or more elements of the keyboard. For example, within a Latin writing system, French and other romance languages may have certain accents, such as grave accent, that may not be used in other Latin script-based languages, such as English. The actuation of one or more elements of the keyboard 110, such as the button 164, in conjunction with the sliding switch 160 and one or more keys 150 may select a letter with an appropriate accent or other modification thereto. Additionally, multiple language scripts may be selectable for the keyboard 110, especially in markets where there is usage of multiple languages in a the same geography, such as the Southwestern part of the United States of America (USA), India, or Europe. As an example, a keyboard 110 used in West Bengal, India may be configured to be selectable between a Latin script, such as English, and two different Devanagari scripts, such as Hindi and Bengali. In certain embodiments, the selection of various scripts may be made by a user of the keyboard 110 in a set-up procedure or routine by interacting with software and hardware associated with the keyboard 110.

Figure 4:
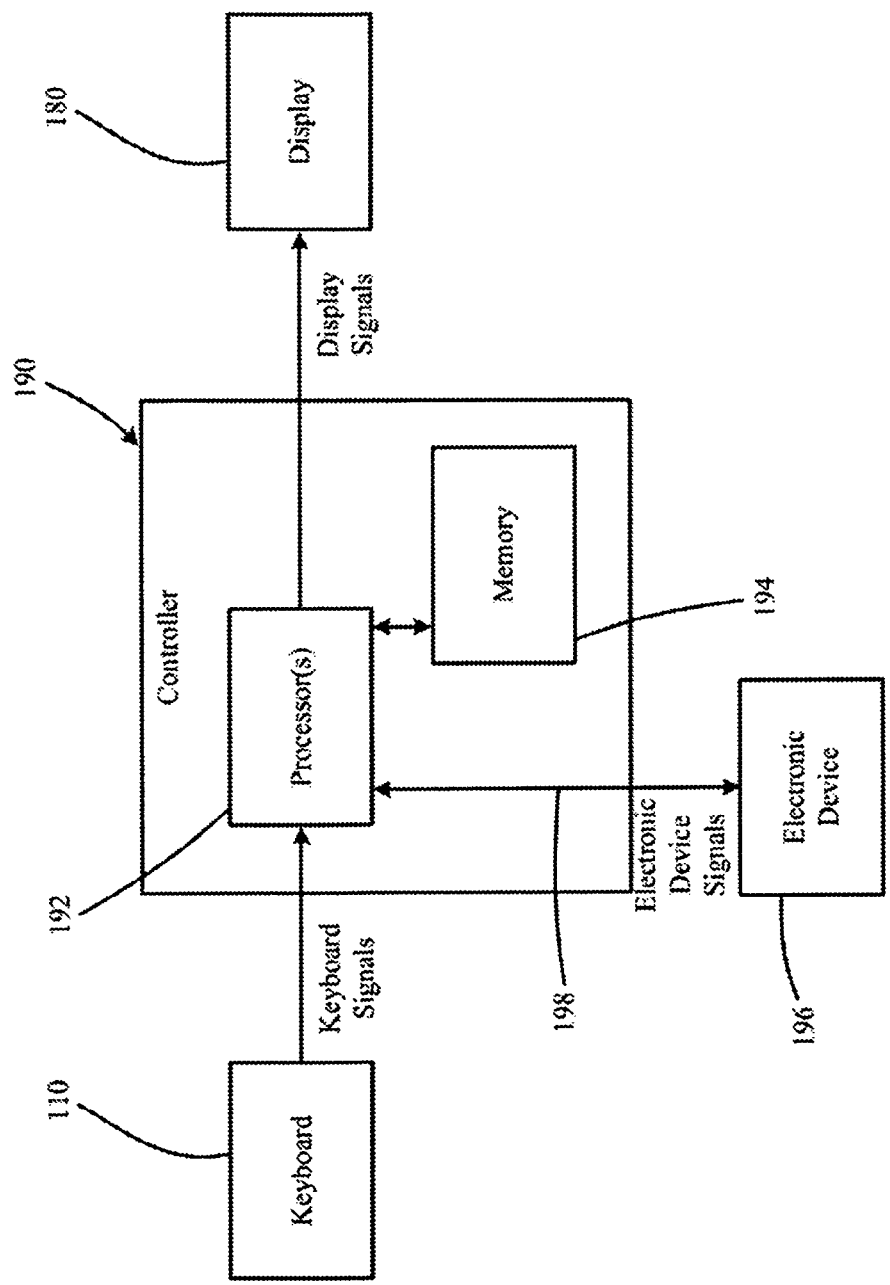
FIG. 4 is a simplified block diagram illustrating an example system for receiving keyboard signals and interpreting alphanumeric information therefrom for display in accordance with embodiments of the disclosure.

Referring now to FIG. 4, an example system 190 for receiving and processing keyboard signals generated based on user interaction with the keyboard 110 in accordance with embodiments of the disclosure is illustrated. The system 190 may include one or more processors 192 communicatively coupled to an electronic memory 194. The one or more processors 192 may further be communicatively coupled to the keyboard 110 and receive keyboard signals generated therefrom. Additionally, the one or more processors 192 may be optionally communicatively coupled to the display device 180 and provide display signals thereto. Further yet, the one or more processors 192 may be communicatively coupled to an electronic device 196, such as a communications device, via communicative link 198.

The one or more processors 192 may include, without limitation, a central processing unit (CPU), a digital signal processor (DSP), a reduced instruction set computer (RISC), a complex instruction set computer (CISC), a microprocessor, a microcontroller, a field-programmable gate array (FPGA), or any combination thereof. The system 190 may also include a chipset (not shown) for controlling communications between the one or more processors 192 and one or more of the other components of the system 190. In certain embodiments, the system 190 may be based on an Intel® Architecture system and the one or more processors 192 and chipset may be from a family of Intel® processors and chipsets, such as the Intel® Atom® processor family. The one or more processors 192 may also include one or more application specific integrated circuits (ASICs) or application specific standard products (ASSPs) for handling specific data processing functions or tasks.

In certain embodiments, the system 190 may be a part of a general vehicle main computer system. In one aspect, the main computer may manage various aspects of the operation of the vehicle, such as engine control, transmission control, and various component controls. Therefore, in such embodiments, the system 190 may share resources with other subsystems of the main vehicle computer. Such resources may include the one or more processors 192 or the memory 194. In other embodiments, the system 190 may be a separate and stand-alone system that receives keyboard signals and manages interactions with other devices.

The memory 194 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof. In one aspect, the software or instructions that are executed by the one or more processors 192 for inter-vehicle communications may be stored on the memory 194.

The electronic device 196 may be any suitable device, such a communications device, that receives textual input. For the purpose of this discussion, the electronic device 196 may include, but is not limited to, a smart phone, a cellular telephone, a tablet computer, a notebook computer, a netbook computer, a personal digital assistant (PDA), a digital reader, or any other suitable electronic device with communicative capability. In one aspect, the electronic device may be a portable or mobile electronic device. In another aspect, the electronic device may configured to receive electronic device signals corresponding to textual information entered by the user onto the keyboard 110 using, for example, the methods described above.

The communicative link 198 may be any suitable link for communications between the electronic device 196 and the one or more processors 192. The communicative link 198 may include, but is not limited to, a hardwired connection, a serial link, a parallel link, a wireless link, a Bluetooth® channel, a ZigBee® connection, a wireless fidelity (Wi-Fi) connection, a proprietary protocol connection, or combinations thereof. In one aspect, the communicative link 198 may be secure so that it is relatively difficult to intercept and decipher electronic device 196 signals transmitted on the communicative link 198. The communicative link 198 may, in certain embodiments, be associated with vehicle communications infrastructure, such as a car data bus or a controller area network (CAN).

In operation, the one or more processors 192 may receive keyboard signals based on user input on the keyboard 110 where the user actuates one or more elements of the keyboard 110. As discussed above, the keyboard signals may be any variety of analog or digital signals, such as digital signals representative of ASCII codes. The one or more processors 192 may interpret the keyboard signals as a series of symbols corresponding to the keyboard signals. It will be appreciated that a separate signal may be received by the one or more processors 192 from each of the keyboard sections 114, 118, and 120.

The one or more processors 192 may further generate electronic device signals, based on the series of signals that may be communicated over the communicative link 198 to the electronic device 196. In one aspect, the electronic device signals may be received and interpreted by software running on the electronic device. For example, a text messaging application software running on a smart phone device may receive the electronic device signals from the one or more processors 192 via communicative link 198 and interpret the series of symbols. In one aspect, the text messaging application may utilize the series of symbols to generate a text message, or a portion thereof, on the electronic device 196.

The one or more processors 192 may optionally generate display signals based on the series of symbols and provide the same to the display device 180. In one aspect, the display device 180 may display the series of symbols, or portions thereof, on the display screen 182 based upon the received display signals from the one or more processors 192.

Figure 5:
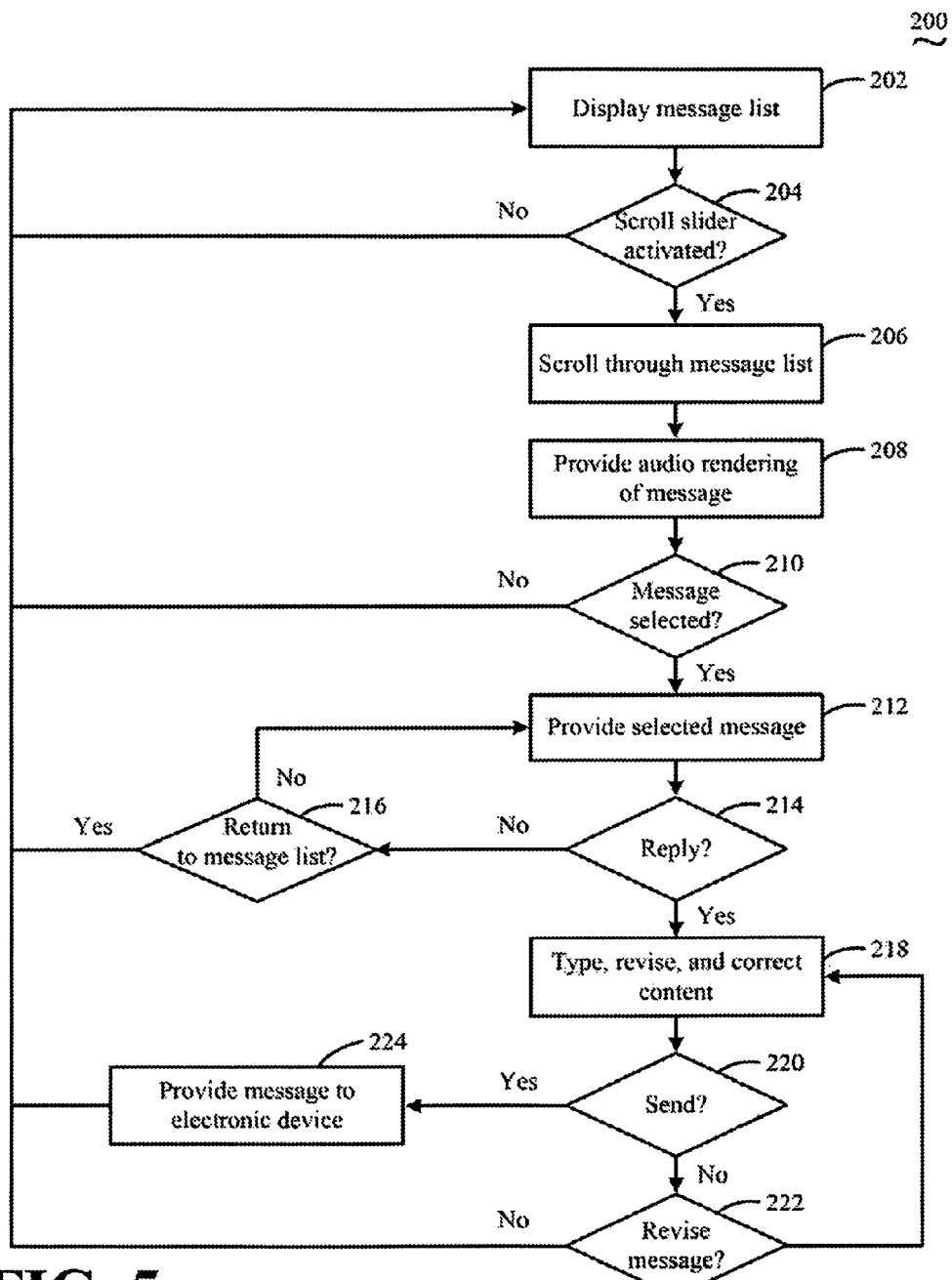
FIG. 5 is a simplified flow diagram illustrating an example method for interpreting user inputs from the keyboard of FIG. 1 for generating a message in accordance with embodiments of the disclosure.

Referring now to FIG. 5, an example method 200 for providing messages to the electronic device 196 is illustrated. At block 202, a list of messages, such as text messages, may be displayed. As discussed with reference to FIG. 1, the list of text messages may be displayed on the display screen 182 of display device 180 or any other suitable display device. Alternatively, the list may be displayed, for example, on a center console of the vehicle or other control or input/output surfaces.

At block 204, it may be determined whether the scroll slider is activated. The determination may be made by the one or more processors 192 based on the keyboard signals received from the keyboard 110. In one aspect, the keyboard signals may be indicative of the scroll slider 126 being actuated by a user. If at block 204, it is determined that the scroll slider 126 is not activated, then the method 200 may return to block 202 and continue to display the list of messages.

However, if at block 204, it is determined by the one or more processors 192 that the scroll slider 126 is activated, then at block 206, the text message list may be scrolled through. In one aspect, the one or more processors 192 may determine the direction to scroll, such as up, down, left, or right, based on the keyboard signals received. In one aspect, the key board signal may be representative of the location where one touches the scroll slider 126 or a direction of sliding one's thumb 142 on the scroll slider 126. Therefore, the location where one touches the scroll slider 126, or a direction of sliding one's thumb 142 on the scroll slider 126, or both, may determine the direction of the scroll. As a non-limiting example, if one touches near the top of the scroll slider 126, then the scroll direction may be up. As another non-limiting example, if one slides one's thumb 142 on the scroll slider 126 in a downward motion, then the list may scroll down. Therefore, the one or more processors 192 may generate and provide display signals to the display device 180 based in part on the intended scrolling direction and speed that displays the desired scroll with associated scroll parameters, such as scroll direction and scroll speed. During the scrolling process, the user may stop at a particular message.

At block 208, an audio rendering of a message may be provided. In this case, the message may be the message on which the user stopped scrolling at step 206. It should be noted that the step is optional. The audio rendering of the message may be provided via one or more speakers associated with the vehicle.

At block 210, it may be determined whether a message is selected. Selecting a message may be performed by the user by actuating one of the elements of the keyboard 110. For example, the user may press the button 128 to select a message. The message selected may be the message on which the user stopped scrolling at block 206. If it is determined that a message has not been selected, then the method 200 may return to block 202 to continue displaying the list of messages.

However, if it is determined at block 210 that the messages selected by actuating one or more elements of the keyboard 110, then at block 212, the selected message may be provided to the user. In one aspect, the message may be provided by rendering the selected message on one or more audio elements. Alternatively, the message may be provided by displaying the text of the message on the display device 180 and the display screen 182 associated therewith.

At block 214, it may be determined if a reply is requested by the user. The reply request may be determined by the one or more processors 192 based upon keyboard signals provided thereto. In particular, the keyboard signals may indicate an actuation of one or more elements keyboard 110 to indicate that the user wishes to send a reply to the message. Similarly actuation of other elements of the keyboard 110 may indicate that the user does not wish to send a reply to the message. For example, actuation of the button 128 may be indicative of the user intending to reply to the message, while actuation of the button 130 may be indicative of the user not intending to reply to the message.

At block 216, it may be determined whether the user wishes to return to the message list. The determination may be made by the one or more processors 192 based upon keyboard signals provided thereto. For example, the actuation of one or more elements of the keyboard 110 may indicate whether a user desires to return to the message list. In another example, actuation of the button 128 may be indicative of the user intending to return to the message list while actuation of the button 130 may be indicative of the user not intending to return to the message list.

If at block 216 it is determined that the user does not want to return to the message list, then the method 200 may return to block 212 and provide the selected message to the user again. This may entail providing the message on the display device 180 or rendering audio associated with the message via one or more audio elements, such as speakers. However, if at block 216 it is determined that the user does want to return to the message list, then the method 200 returns to block 202 to display the message list.

At block 214, if it is determined that the user wishes to reply to the message, then at 218, the user is provided the opportunity to type, revise, and correct content associated with a reply message. The actions of typing, revising, and correcting may be controlled by the user via the keyboard 110 by actuating one or more elements of the keyboard 110 in a particular sequence. For example, the user may write a message consisting of a sequence of symbols, by actuating a combination of input elements of the keyboard 110 in a sequence corresponding to the sequence of symbols.

At block 220, it is determined whether the user wishes to send the message. The user may indicate his or her desire whether to send the message by actuating corresponding elements on the keyboard 110 that are indicative of the same. If it is determined at block 220 that the user does not want to send the message, then at block 222, it is determined whether the user wishes to revise the message. The determination of whether the user wishes to revise the message may be ascertained based upon keyboard signals received by the one or more processors 192 corresponding to elements of the keyboard 110 that are actuated by the user. If it is determined at block 222 that the user wishes to revise the message, then the method returns to block 218 so that the user may make revisions. However, if at block 222, it is determined that the user does not want to revise the message, then the method 200 may return to block 202 to display the message list.

At block 220, if it was determined that the user based on user input to the keyboard 110 intended to send the message, then at block 224, the message is provided to the electronic device. The electronic device 196, in turn, may send the message to the intended recipient of the message via a variety of electronic communications channels, such as by cellular communications.

It should be noted, method 200 may be modified in various ways in accordance with certain embodiments of the disclosure. For example, one or more operations of method 200 may be eliminated or executed out of order in other embodiments of the disclosure. Additionally, other operations may be added to method 200 in accordance with other embodiments of the disclosure.

Figure 6:
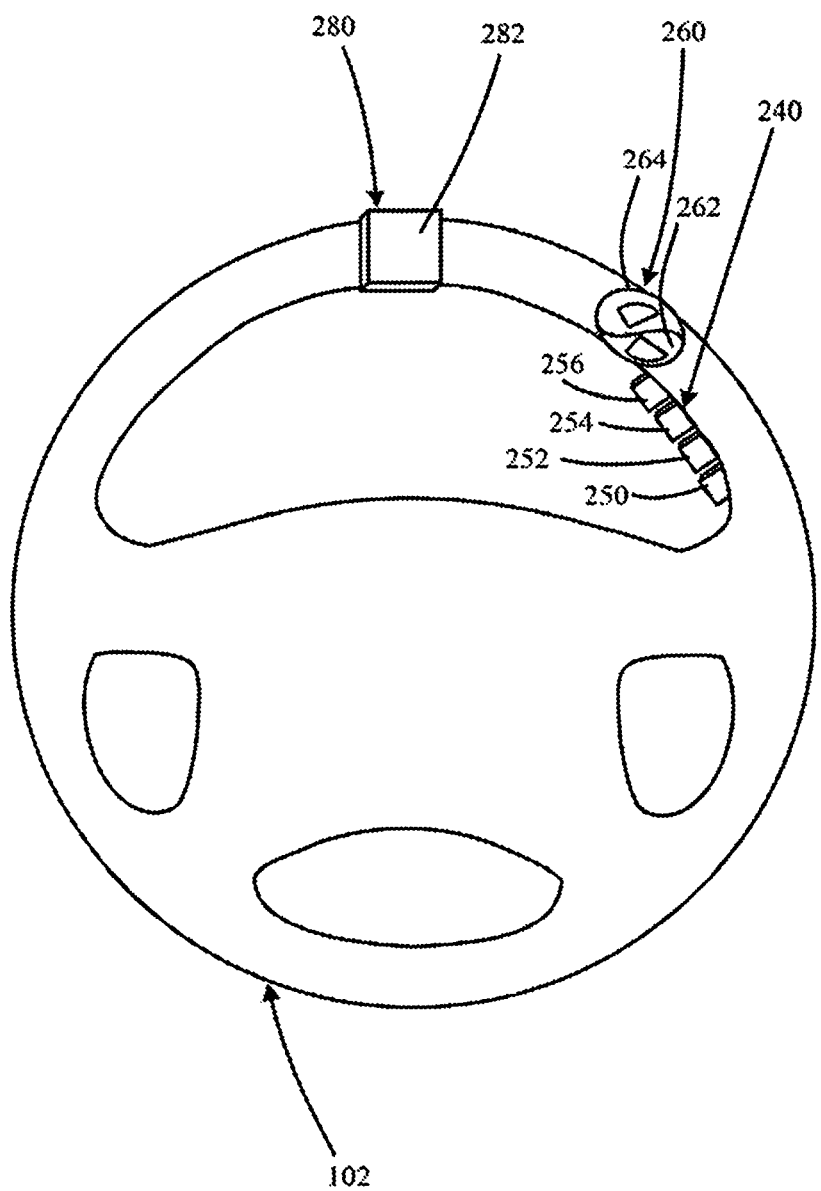
FIG. 6 is a simplified schematic diagram illustrating another example steering wheel with an example keyboard and display device disposed thereon in accordance with embodiments of the disclosure.

Referring now to FIG. 6, another example of a keyboard 240 provided on a steering wheel 242 in accordance with embodiments of the disclosure is illustrated. The keyboard 240 may include one or more keys, such as four keys 250, 252, 254, and 256. As depicted, in certain embodiments, the keys 250, 252, 254, and 256 may protrude radially inward from the inner circumference of the rim of the steering wheel 242. In other embodiments, the keys 250, 252, 254, and 256 may be located at any suitable location on the steering wheel 242, such as at the hub or on the side of the rim of the steering wheel 242. The keyboard 240 may further include one or more switches 260. The one or more switches 260 may include, for example, two switches 262 and 264. As in the implementation of FIG. 1, a steering wheel 242 may also have a display device 280 with display screen 282 provided thereon.

In certain embodiments, the keys 250, 252, 254, and 256 may be depressed with the fingers of one's hand while holding the steering wheel 242. At the same time, the thumb of the same hand may be used to depress one of switches 262 and 264. The keys 250, 252, 254, and 256, as well as the switches 262 and 264, may provide two states. In other words, they may be either depressed or not depressed. In other embodiments, one or more of the keys 250, 252, 254, and 256 or the switches 262 and 264 may provide more than two states, such as three states. In other words, it may be possible to depress, for example the keys 250, 252, 254, and 256 to three distinct levels, such as not pressed, partially pressed, or fully pressed.

During operation, elements of the keyboard 240 may be actuated by a user. For example, the user may press any combination of keys 250, 252, 254, and 256 or switches 262 and 264. Each combination of key presses and switch presses corresponds to a distinct symbol. Electronic keyboard signals may be generated by the keyboard 240 indicative of which of the keys 250, 252, 254, and 256 and switches 262 and 264 are depressed. These keyboard signals may be interpreted by a system similar to system 190 of FIG. 4 to generate display signals and electronic device signals therefrom.

As an example, consider that the keys 250, 252, 254, and 256 and switches 262 and 264 may provide two states, in that they are either pressed or not pressed. Suppose further, that switch 262 represents a single character, such as a space. In other words, a space may be represented when switch 262 is depressed by a user. As the remaining switch 262, in conjunction with the keys 250, 252, 254, and 256, may have two states associated therewith, there may be a total of thirty-two possible combinations of key and switch presses. As a result, thirty-two unique symbols may be represented in this embodiment.

In certain other embodiments, both switches 262 and 264, as well as, the keys 250, 252, 254, and 256, may have two states associated therewith with and may be used to select a variety of symbols. In this embodiment, there may be sixty-four possible combinations of keys and switch presses. As a result, sixty-four unique symbols may be represented with this example implementation.

Figure 7:
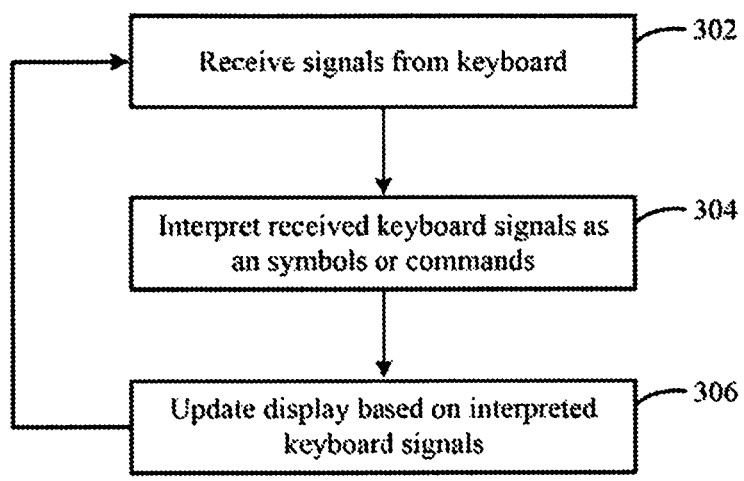
FIG. 7 is a simplified flow diagram illustrating an example method for interpreting and updating a display based on user input from the example keyboard of FIG. 6 in accordance with embodiments of the disclosure.

Referring now to FIG. 7, example method 300 for updating the display corresponding to usage of the keyboard 240 is illustrated. At block 302 signals from the keyboard may be received. The signals may correspond to a user actuating one or more elements of the keyboard 240. The signals may further be received by one or more processors configured to interpret symbols corresponding to the actuation of elements of the keyboard 240 as represented by the keyboard signals. At block 302, the receive keyboard signals may be interpreted as alphanumeric symbols or commands. This function may also be performed by one or more processors configured to interpret the keyboard signals. The one or more processors may further generate display signals based upon the interpreted numeric symbols corresponding to the keyboard signals and provide the same to the display 280. As a result, at block 306, the display may be updated based upon interpreted keyboard signals.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritable (CD-RWs), and magneto-optical disks, semindiciaductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. Therefore, the present disclosure should be considered to encompass such combinations, variations, and modifications.

The terms and expressions which have been employed herein are used as terms of description and not of limitation. There is no intention, in the use of such terms and expressions, of excluding any equivalents of the features shown and described, or portions thereof. It is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments. On the contrary, the invention is intended to cover various modifications and equivalent arrangements included within the scope of the claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:

receiving, by at least one processor associated with a vehicle, a first signal from a first input sensor section comprising one or more keys and associated with a vehicle, wherein the first signal is indicative of an actuation of at least one of the one or more keys, wherein each of the one or more keys correspond to symbols from a first set of symbols or symbols from a second set of symbols;

receiving, by the at least one processor, a second signal from a second input sensor section associated with the vehicle and separate from the first input sensor section, wherein the second signal is indicative of a state of a switch included in the second input sensor section, and wherein a symbol input associated with the at least one of the one or more keys is based at least in part on the state of the switch, wherein the state of the switch corresponds to one of the first set of symbols or the second set of symbols;

determining, by the at least one processor, the symbol input associated with a textual message based at least in part on both the first signal and second signal; and providing, by the at least one processor, a display signal to a display associated with the vehicle to display the symbolic input.

2. The method of claim 1, wherein the first signal indicates that the at least one of the one or more keys have been pressed.

3. The method of claim 1, wherein the switch comprises a slider switch and the state of the switch corresponds to a position of a slider of the slider switch.

4. The method of claim 3, wherein the position is one of: (i) a first position corresponding to a first state, or (ii) a second position corresponding to a second state.

5. The method of claim 4, wherein possible positions of the slider includes a third position corresponding to a third state.

6. The method of claim 1, further comprising storing a mapping of symbols to combinations of the first signal and the second signal.

7. The method of claim 1, wherein the first input sensor section and the second input sensor section is mounted on a steering wheel of the vehicle.

8. The method of claim 1, further comprising receiving a third signal from a third section of the input sensor.

9. The method of claim 8, wherein the determining a symbol input is based at least in part on the third signal.

10. The method of claim 8, wherein the third section of the input sensor comprises a scroll slider input device.

11. A steering wheel of a vehicle comprising:
a first input section comprising a plurality of keys and configured to provide a first signal based on actuation of one or more of the plurality of keys, wherein each of the one or more keys correspond to symbols from a first set of symbols or symbols from a second set of symbols;
a second input section comprising a switch and configured to provide a second signal based on a state of the switch, wherein a symbol input associated with the one or more of the plurality of keys is based at least in part on the state of the switch, wherein the state of the switch corresponds to one of the first set of symbols or the second set of symbols;
at least one processor communicatively coupled to both the first input section and the second input section and configured to receive the first signal and the second signal and generate a display signal based at least in part on both the first signal and the second signal; and
a display communicatively coupled to the at least one processor and configured to receive the display signal and provide a display output based on the display signal.

12. The steering wheel of claim 11, wherein the plurality of keys comprise a capacitive panel sensor.

13. The steering wheel of claim 11, wherein an area of one or more of the plurality of keys is different from an area of the other of the plurality of keys.

14. The steering wheel of claim 13, wherein the areas of keys most distal from a rim of the steering wheel have a greater area than keys that are relatively more proximal to the rim.

15. The steering wheel of claim 11, wherein, the switch comprises a slide switch having a slider, wherein the position of the slider corresponds to the state of the switch.

16. The steering wheel of claim 11, further comprising an electronic memory communicatively coupled to the at least one processor and configured to store a mapping of symbols to various combinations of the first signal and the second signal.

17. The steering wheel of claim 16, wherein the generating the display signal comprises comparing the first signal and the second signal to the mapping.

18. The steering wheel of claim 11, wherein the display output comprises at least one symbol.

19. The steering wheel of claim 11, further comprising a third input section and configured to provide a third signal to the at least one processor.

20. The steering wheel of claim 19, wherein the third input section comprises a scroll slider input device.

21. A chordic keyboard provided associated with, a vehicle comprising:
at least four keys and configured to provide a key signal, wherein each of the at least four keys correspond to symbols from a first set of symbols or symbols from a second set of symbols;
a switch configured to be selectively actuated contemporaneously with one or more of the at least four keys and configured to provide a switch signal;
at least one processor configured to receive the key signal and the switch signal and determining a symbol corresponding to both the received key signal and switch signal, wherein the actuation of the switch corresponds to one of the first set of symbols or the second set of symbols;
at least one display communicatively coupled to the at least on processor and configured to display the determined symbol.

22. The chordic keyboard of claim 21, wherein the at least four keys are mounted on a rim of a steering wheel.

23. The chordic keyboard of claim 21, wherein the at least four keys comprises four keys.

24. The chordic keyboard of claim 23, wherein one or more of the four keys are configured to be actuated in various combinations contemporaneously with the first switch.

25. The chordic keyboard of claim 23, wherein each unique variation of actuated keys along with the actuated first switch correspond to a respective symbol.

26. The chordic keyboard of claim 21, further comprising an electronic memory communicatively coupled to the at least one processor and configured to store a mapping of symbols to various combinations of the key signal and the switch signal.

27. The chordic keyboard of claim 26, wherein determining a symbol comprises comparing the first signal and the second signal to the mapping.

28. At least one non-transitory computer readable medium comprising computer-executable instructions that, when executed by one or more processors associated with a vehicle, executes a operations comprising:
receiving a first signal from a first input sensor section mounted on a steering wheel, wherein the first signal is indicative of an actuation of at least one key of the first input sensor section, wherein each of the at least one keys correspond to symbols from a first set of symbols or symbols from a second set of symbols;
receiving a second signal from a second input sensor section mounted on the steering wheel, wherein the second signal is indicative of a state of a switch of the second input sensor section, and wherein a symbol input associated with the at least one key is based at least in part on the state of the switch;
determining a symbol input based in part on both the first signal and second signal wherein the state of the switch corresponds to one of the first set of symbols or the second set of symbols; and, providing a display signal to a display mounted on the steering wheel to display the symbol input.

29. The non-transitory computer readable medium of claim 28, wherein the operations further comprising storing a mapping of symbols to various combinations of the first signal and the second signal.

30. The non-transitory computer readable medium of claim 29, wherein determining the symbol input comprises comparing the first signal and the second signal to the mapping.

* * * * *